United States Patent
Ryken et al.

(10) Patent No.: US 6,320,533 B1
(45) Date of Patent: Nov. 20, 2001

(54) ELECTRONIC SWITCHING INTERFACE FOR USE IN RADAR SYSTEMS

(75) Inventors: Marvin L. Ryken, Ventura; Paul H. Sailer, Camarillo, both of CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/558,688

(22) Filed: Apr. 24, 2000

(51) Int. Cl.$^7$ ............................... G01S 7/02; G01S 13/02
(52) U.S. Cl. ................ 342/175; 342/59; 342/82; 342/89; 342/195; 343/876; 343/893
(58) Field of Search ................. 342/59, 73, 74, 342/82, 89, 175, 195, 350; 343/720, 725, 729, 850, 852, 853, 876, 893

(56) References Cited

U.S. PATENT DOCUMENTS

| | | | |
|---|---|---|---|
| 3,028,591 | * 4/1962 | Mattingly | 342/175 |
| 3,048,824 | * 8/1962 | Thompson | 342/175 X |
| 3,840,875 | * 10/1974 | Neal | 342/175 |
| 4,885,589 | * 12/1989 | Edward et al. | 342/175 |

* cited by examiner

Primary Examiner—Bernarr E. Gregory
(74) Attorney, Agent, or Firm—David Kalmbaugh (57) ABSTRACT

A switching interface for routing RF signals. The interface comprises a buffer decoder which receives first, second and third control signals and then decodes the signals to selectively turn on five RF switches. The decoded output signals from the buffer decoder are supplied to five pair of switch drivers for the RF switches. When a logic one is provided to a switch driver, the switch driver sets the RF switch to an ON position. When a logic zero to a switch driver, the switch driver set the RF switch to an OFF position. A window comparator monitors the outputs of the switch drivers for each of the five RF switches. Whenever one of the two output signals from the switch drivers is within a preset voltage range the window comparator provides a logic one and a logic zero which are supplied to a bit decode circuit. The bit decode circuit then decodes the signals from each of the five window comparators, providing a three bit status signal which indicates that the switch drivers for each RF switch are operating normally. When, however, both output signals from any one of the five window comparators have the same state logic state, the bit decode circuit will provide at its output a three bit logic one error signal which indicates that one of the switch drivers is operating in an open circuit condition or a short circuit condition.

19 Claims, 12 Drawing Sheets

ELECTRONIC SWITCHING INTERFACE FOR USE IN RADAR SYSTEMS

BACKGROUND OF THE INVENTION

1. Field of the Invention

The present invention relates generally to radar transmission and receiving systems. More specifically, the present invention relates to a digital interface which allows multiple transmitters and receivers to interface with more than one antenna.

2. Description of the Prior Art

With radar systems becoming extremely complex and often having multiple antenna for transmitting and receiving RF (radio frequency) signals, there is a need to allow a transmitter or a receiver to be selectively coupled to multiple antennas. This is especially important when space is limited.

In addition, there is a need to provide a switching means for allowing multiple transmitters operating at different frequencies to be coupled to multiple antennas.

For example, on board a battle ship or destroyer, the military may having multiple antenna for transmitting and receiving RF signals but have limited space for the electrical components, i.e. transmitters and receivers required to transmit and receive the signals. This, in turn, necessitates that a reliable switching network be provided that will allow, for example, a transmitter to be switch from one antenna to another antenna or even a third antenna. Similarly, the switching network should allow a receiver to be selectively coupled to multiple antenna.

There is also a need to provide a means to allow a user to monitor the switching elements of the switching network by providing status information relative to the operation of the switching elements.

SUMMARY OF THE INVENTION

The present invention comprises a highly effective and efficient electronics switching interface which has five radio frequency (RF) switches for routing RF signals from multiple input terminals to one output terminal and for routing RF signals from one input terminal to multiple output terminals.

The electronics switching interface comprises a buffer decoder which receives first, second and third control signals and then decodes the signals to selectively turn on the five RF switches.

Each of the five RF switches has a pair of switch drivers connected to the switch. The decoded output signals from the buffer decoder are logic one and logic zero signals which are supplied to the five pair of switch drivers for the RF switches. When a logic one is provided by the buffer decoder to the switch drivers for any one of the five RF switches, the switch drivers for the RF switch set the RF switch to an ON position. When a logic zero is provided by the buffer decoder to the switch drivers for any one of the five RF switches, the switch drivers for the RF switch set the RF switch to an OFF position.

A window comparator, connected to each pair of switch drivers, monitors the output signals from the switch drivers for each of the five RF switches. Whenever one of the two output signals from the switch drivers is within a preset voltage range the window comparator for each pair of switch drivers provides a logic one and a logic zero which are supplied to a bit decode circuit. The bit decode circuit then decodes the signals from each of the five window comparators, providing a three bit status signal which indicates that the switch drivers for each RF switch are operating normally by providing a positive voltage signal within the preset voltage range to the RF switch.

When, however, both output signals from any one of the five window comparators have the same state logic state, the bit decode circuit will provide at its output a three bit logic one error signal which indicates that one of the switch drivers is operating in an open circuit condition or a short circuit condition.

DETAILED DESCRIPTION OF THE PREFERRED EMBODIMENT

Figure 1:
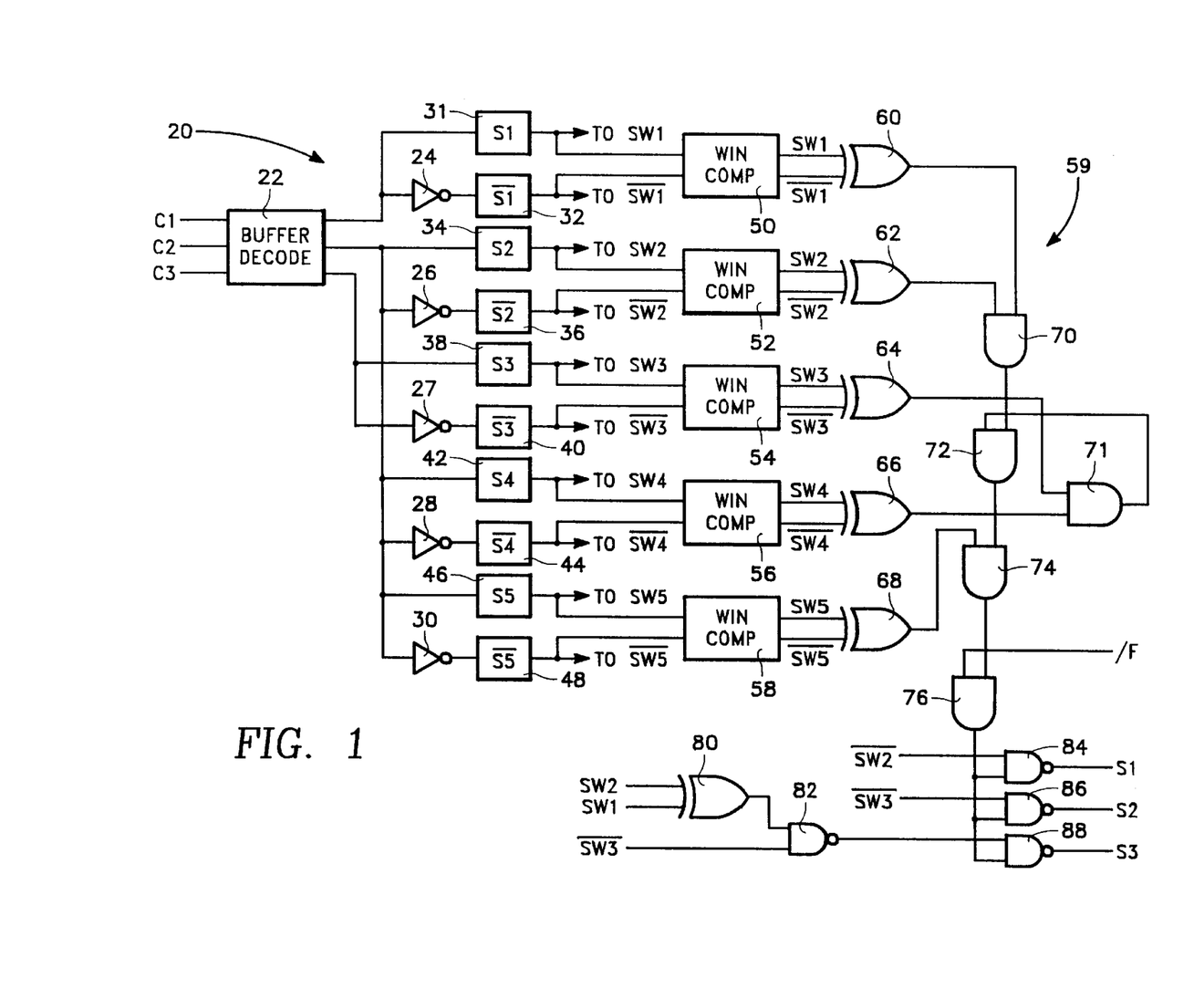
FIG. 1 is a simplified electronic circuit diagram of the electronic switching interface adapted for use in radar systems which constitutes the present invention.

Referring to FIG. 1, there is shown a simplified electronic circuit diagram of the electronic switching interface, designated generally by the reference numeral 20, which constitutes the present invention. The electronic switching interface 20 receives three logic signals at its inputs C1, C2 and C3 which when decoded by a buffer decoder 22 are supplied to PIN diode/switch drivers S1, S2, S3, S4 and S5, designated respectively by the reference numerals 31, 34, 38, 42 and 46, as well as switch drivers 32, 36, 40, 44 and 48. When switch driver S1 (reference numeral 31) is on, switch driver /S1 (reference numeral 32) is off. Similarly, when switch driver S2 (reference numeral 34) is on, switch driver /S2 (reference numeral 36) is off.

At this time it should be noted that inverters 24, 26, 27, 28 and 30 are used to indicate that whenever switch driver 31, 34, 38, 42 or 46 is turned on, its associated switch driver 32, 36, 40, 44 or 48 will be turned off. Buffer decoder 22 (FIG. 5), however, has a built in inverting function therein consisting of inverters 134, 142, 143, 146 and 150.

Figure 5:
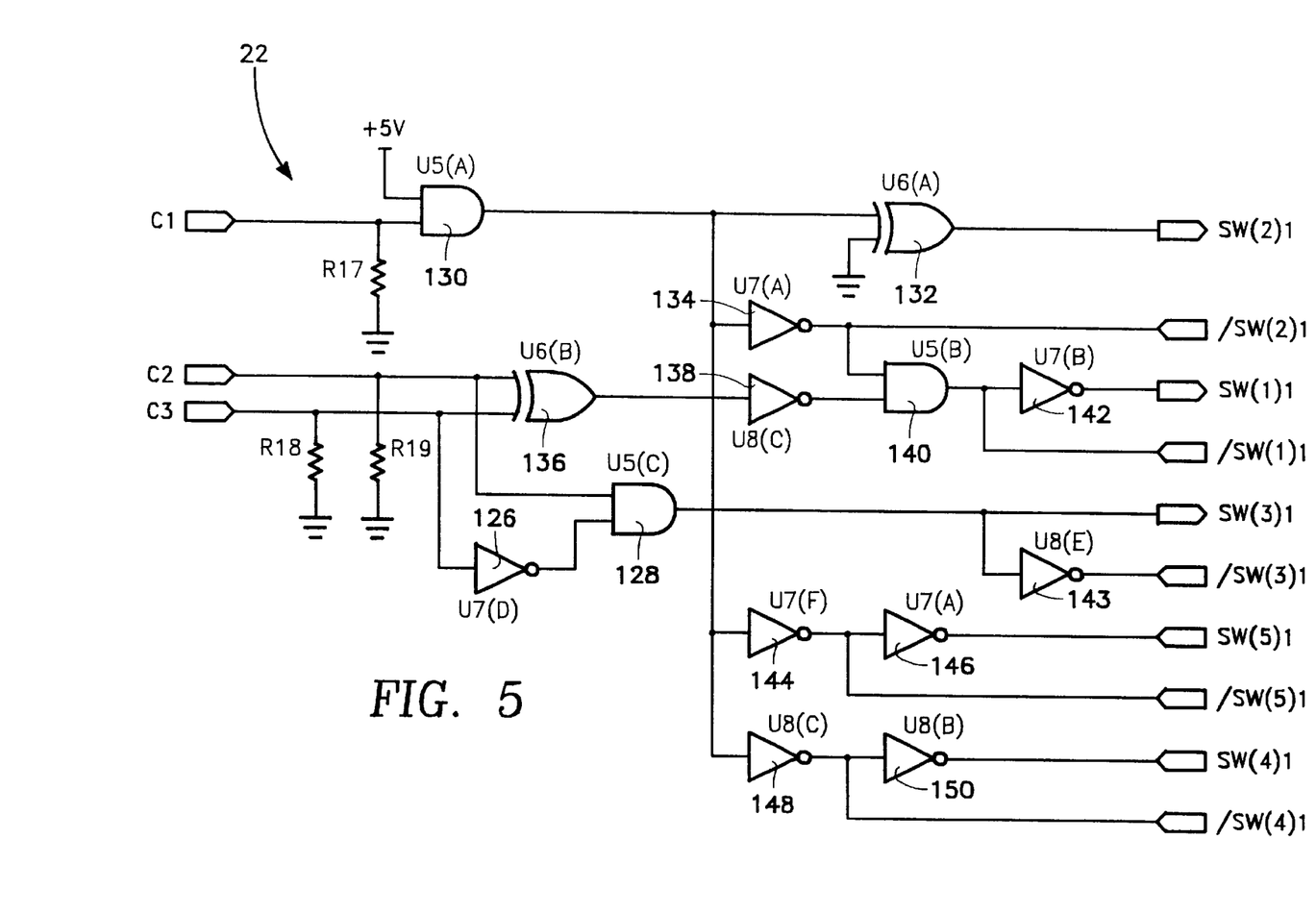
FIG. 5 is a detailed logic diagram of the buffer decode circuit of FIG. 1.
Figure 9:
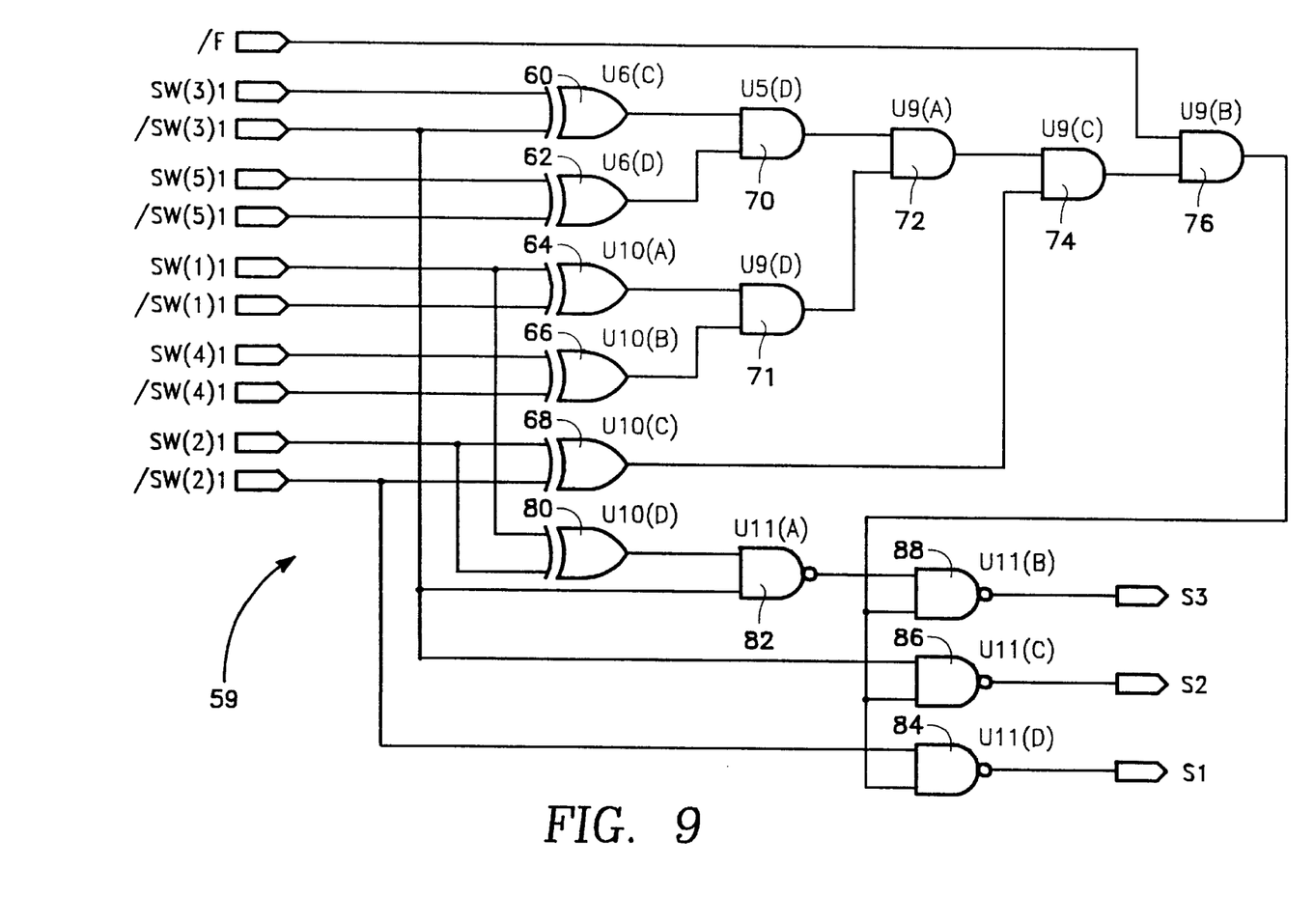
FIG. 9 is a detailed logic diagram of the bit decode circuit of FIG. 1.

Referring to FIGS. 1, 5 and 9, the outputs of switch drivers 31, 32, 34, 36, 38, 40, 42, 44, 46 and 48 are connected respectively to switches 202, 204, 206, 208 and 209 of switching circuit 200 (FIG. 5). The outputs of switch drivers 31, 32, 34, 36, 38, 40, 42, 44, 46 and 48 are also connected respectively to window comparators 50, 52, 54, 56 and 58 which monitors these outputs. The outputs from window comparators 50, 52, 54, 56 and 58 are connected to a bit decode circuit 59. When any of the switch drivers S1, /S1; S2, /S2; S3, /S3; S4, /S4 or S5, /S5 are at the same state, bit decode circuit 59 will provide a signal indicative of an error occurring within the switch drivers.

Referring to FIGS. 1 and 5, the buffer decoder 22 of FIG. 5 receives the three logic signals at its C1, C2 and C3 inputs, decodes the signals and then provides decoded signals at the SW(1)1, /SW(1)1, SW(2)1, /SW(2)1, SW(3)1, /SW(3)1, SW(4)1, /SW(4)1, SW(5)1, and /SW(5)1. Decoder 22 decodes the signals in accordance with the following truth table.

TABLE I

| DECODE INPUTS | | | SWITCH POSITIONS | | | | |
|---|---|---|---|---|---|---|---|
| C1 | C2 | C3 | S1 | S2 | S3 | S4 | S5 |
| 0 | 0 | 0 | OFF | OFF | OFF | OFF | OFF |
| 0 | 0 | 1 | ON | OFF | OFF | OFF | OFF |
| 0 | 1 | 0 | ON | OFF | ON | OFF | OFF |
| 0 | 1 | 1 | OFF | OFF | OFF | OFF | OFF |
| 1 | 0 | 0 | ON | ON | OFF | ON | ON |
| 1 | 0 | 1 | ON | ON | OFF | ON | ON |
| 1 | 1 | 0 | ON | ON | ON | ON | ON |
| 1 | 1 | 1 | ON | ON | OFF | ON | ON |

To illustrate the operation of buffer decoder 22, when C1 "1", C2 is "0" and C3 is "0", the output of AND gate 130 will be a "1", the output of Exclusive-OR gate 136 will be a logic "0", and the output of "AND" gate 128 will be a "0". is results in the output of Exclusive-OR gate 132 being a "1" the output of inverter 134 being a "0", the output of AND gate 140 being a "0" and the output of inverter 142 being a "1". Further, since the output of AND gate 128 is "0", the output of inverter 143 will be a "1". Since the output of AND gate 130 is "1", the output of inverter 144 will be a "0", the output of inverter 148 will be a "0", the output of inverter 156 will be a "1" and the output of inverter 150 will be a "1". The logic ones at the SW(1)1, SW(2)1, SW(4)1 AND SW(5)1 outputs of buffer decoder 22 are supplied to switch driver 31, 34, 42 and 46. The logic zero at the /SW(3)1 output of buffer decoder 22 is supplied to switch driver 40.

In a like manner, when C1 is "1", C2 is "1" and C3 is "0", the output of AND gate 130 will be a "1", the output of Exclusive-OR gate 136 will be a logic "1", and the output of "AND" gate 128 will be a "1". This results in the output of Exclusive-OR gate 132 being a "1, the output of inverter 134 being a "0", the output of AND gate 140 being a "0" and the output of inverter 142 being a "1". Further, since the output of AND gate 128 is "1", the output of inverter 143 will be a "0". Since the output of AND gate 130 is "1", the output of inverter 144 will be a "0", the output of inverter 148 will be a "0", the output of inverter 156 will be a "1" and the output of inverter 150 will be a "1". The logic ones at the SW(1)1, SW(2)1, SW(3)1, SW(4)1 AND SW(5)1 outputs of buffer decoder 22 are supplied to switch driver 31, 34, 38, 42 and 46.

Figure 3:
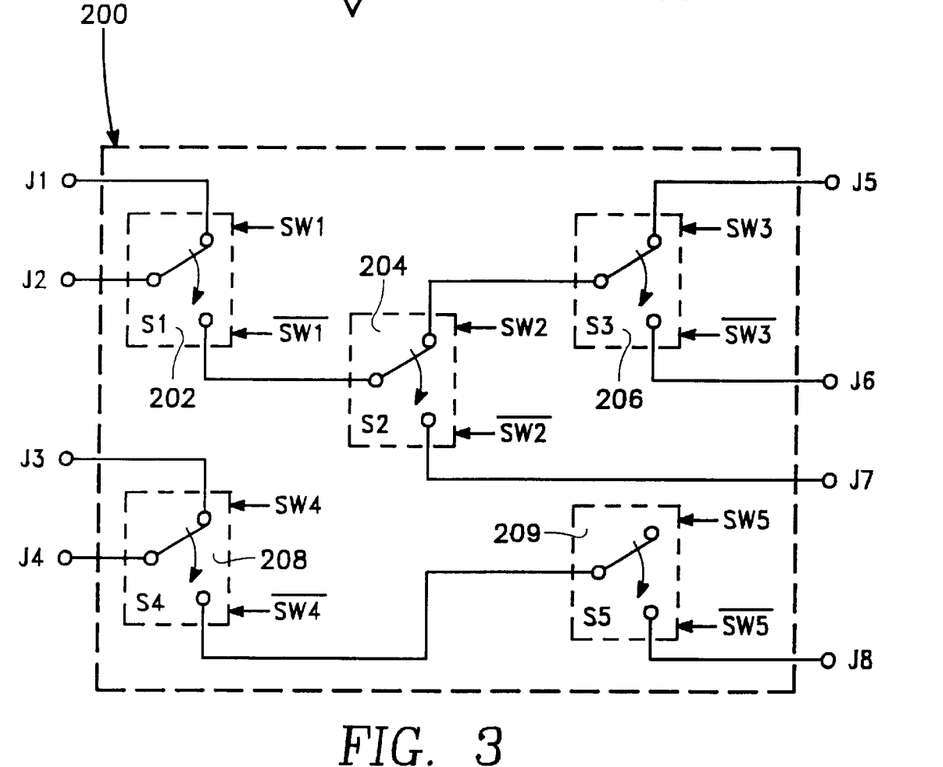
FIG. 3 is a simplified block diagram of the RF switching circuit for the electronic switching interface of FIG. 1.
Figure 6:
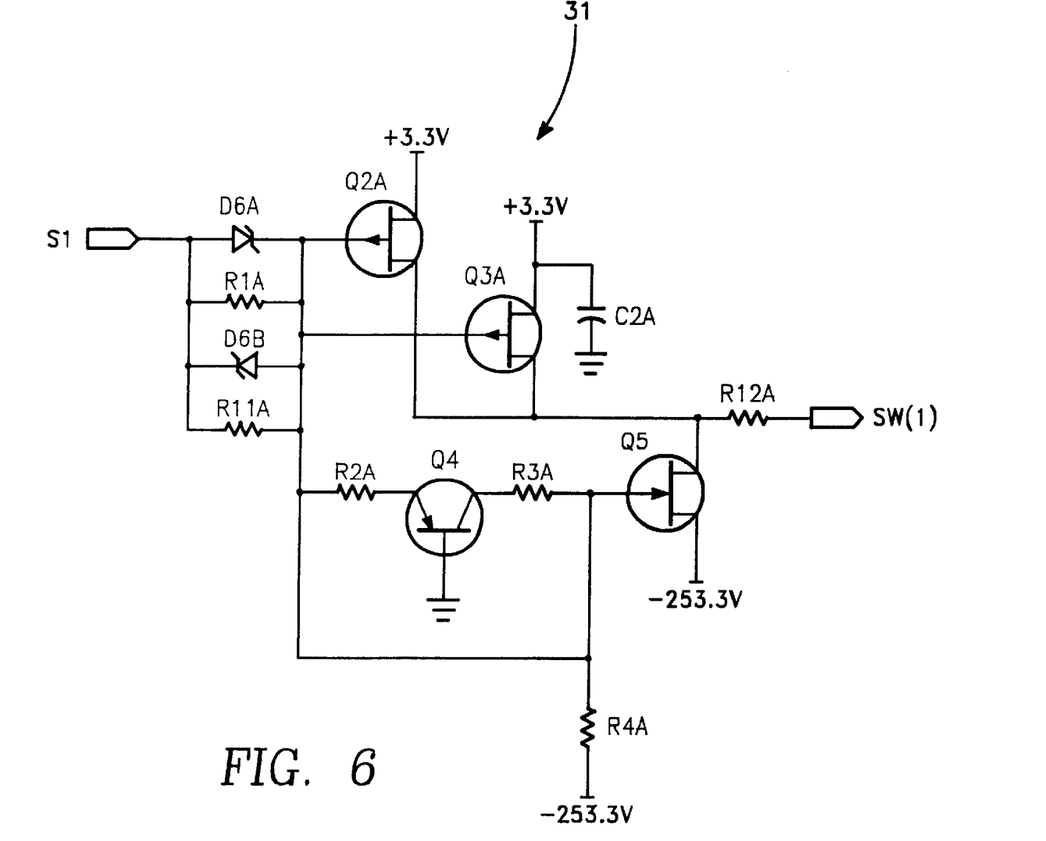
FIG. 6 is detailed electronic circuit diagram of one of the PIN Diode Drivers of FIG. 1 which is one of two drivers for the SPDT switching element of FIG. 4.

Referring now to FIGS. 1 and 6 illustrates one of the two switch drivers for switch 202 (FIG. 3). The logic signal from the SW(l)1 output of buffer decoder 22 is supplied to the Si input of driver 31. This signal will be either a logic one or a logic zero depending upon the decoded output signals from buffer decoder 22. When the Si input is high transistor Q4 turns on causing field effect transistor Q5 to turn on resulting in a voltage of −253.3 volts at the SW(1) output of switch driver 31. When the S1 input is low, i.e. at ground, field effect transistors Q2A and Q3A turn on resulting in a voltage of about 1.5 at the SW(1) output of switch driver 31. It should be noted that there is a voltage drop from about 3.3 volts to about 1.5 volts across resistors R12A (FIG. 6) and R8A (FIG. 7B).

Field effect transistors Q2A and Q3A are in parallel to reduce the resistance in half when field effect transistors Q2A and Q3A are in the "on" condition. Current drawn by field effect transistor Q5 when transistor Q5 is minimal allowing for capacitance discharge. Schottky diodes D6A and D6B and resistors R1A and R11A forms a time delay circuit which prevents transistors Q2A and Q3A from being turned on when transistor Q5 is on. The time delay circuit of D6A and D6B and resistors R1A and R11A also prevents transistors Q5 from being turned on when transistors Q2A and Q3A. This prevents —253 volts from being connected to 3.3 volts which would in excessive current flow through the transistors Q2A, Q2B and Q5.

Figure 7A:
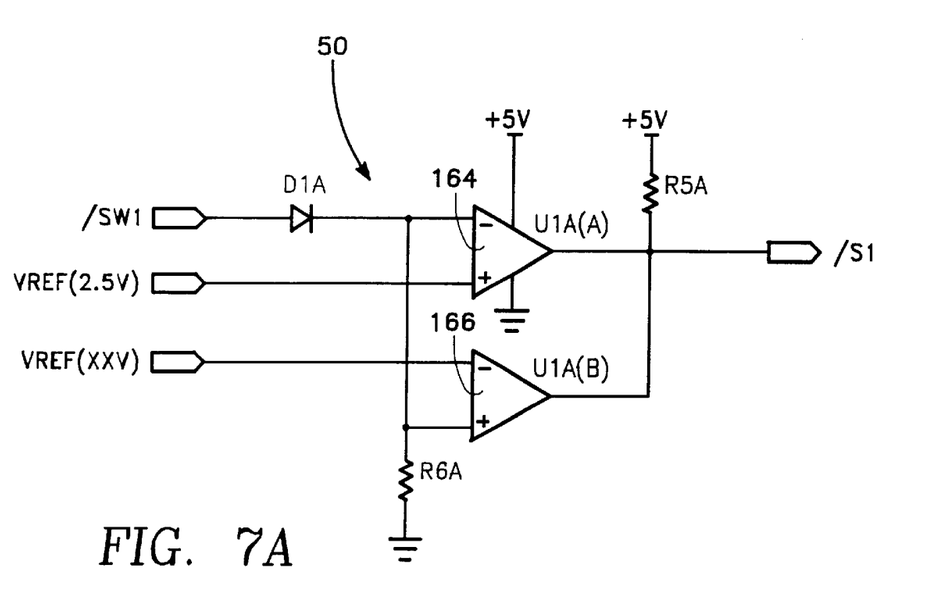
FIGS. 7A and 7B are detailed electronic circuit diagrams of one of the window comparators of FIG. 1.
Figure 7B:
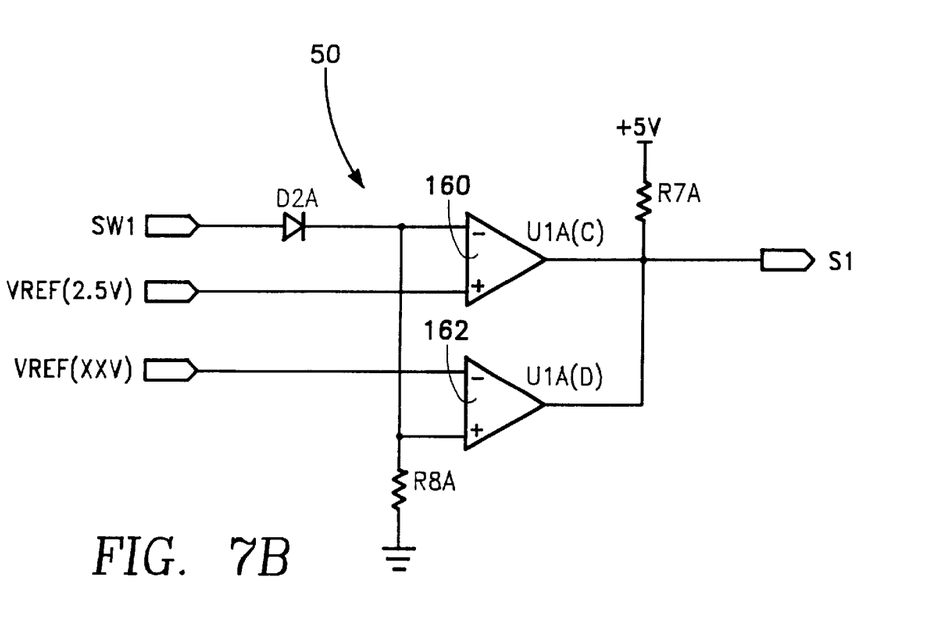

Referring to FIGS. 1, 7A and 7B, window comparator 50 looks at the voltage from switch drivers 31 and 32 to determine if the voltage is within a window having a range from about 2.5 volts to a voltage (identified as VREF(XXV)) which is selected in the preferred embodiment to be about 0.7 of a volt. When driver 31 is on, the voltage supplied by driver 31 to the SW1 input of window comparator is about 1.5 volts which is within the window for window comparator 50. A voltage of about 1.5 volts at the negative input of comparator 160 results in a high at the output of comparator 160, while 1.5 volts at the positive input of comparator 162 results in a high at the output of comparator 162. This, in turn, results in a "1" being supplied to the first input of Exclusive-OR gate 60. Simultaneously, a voltage of −253.3 volts supplied to the /SW1 input of window comparator 50 (FIG. 7A) results in voltage drop of five volts across resistor R5A (FIG. 7A) and a logic zero at the /S1 output of window comparator 50.

Figure 8A:
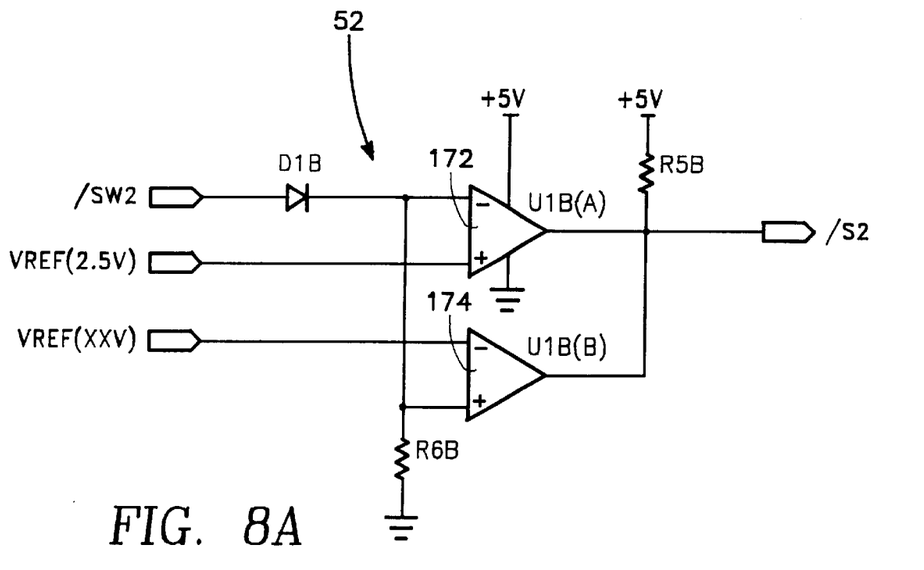
FIGS. 8A and 8B are detailed electronic circuit diagrams of another of the window comparators of FIG. 1.
Figure 8B:
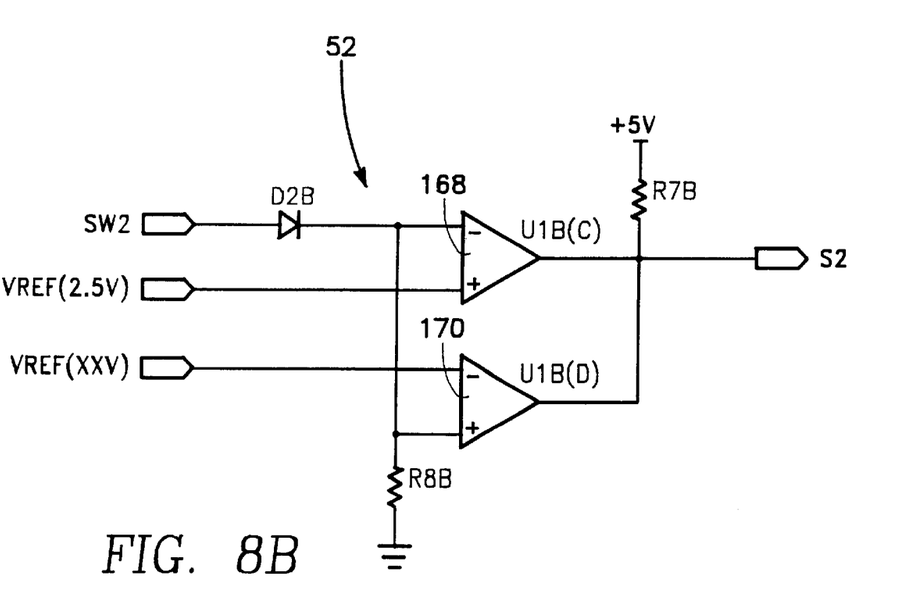

Referring to FIGS. 1, 8A and 8B, the window comparator 52 operates in exactly the same manner as window comparator 50. For example, when comparator 52 receives a voltage of 1.5 volts at its SW2 input, the S2 output will be at the logic zero state since the outputs of comparators 168 and 170 are low.

Referring now to FIGS. 1 and 9, there is shown a truth table which illustrates the operation of bit decode circuit 59.

TABLE II

| DECODE INPUTS | | | BIT DECODE | | | SWITCH POSITIONS | | | | |
|---|---|---|---|---|---|---|---|---|---|---|
| C1 | C2 | C3 | S1 | S2 | S3 | S1 | S2 | S3 | S4 | S5 |
| Z | Z | Z | 0 | 0 | 0 | OFF | OFF | OFF | OFF | OFF |
| 0 | 0 | 0 | 0 | 0 | 0 | OFF | OFF | OFF | OFF | OFF |
| 0 | 0 | 1 | 0 | 0 | 1 | ON | OFF | OFF | OFF | OFF |
| 0 | 1 | 0 | 0 | 1 | 0 | ON | OFF | ON | OFF | OFF |
| 0 | 1 | 1 | 0 | 0 | 0 | OFF | OFF | OFF | OFF | OFF |
| 1 | 0 | 0 | 1 | 0 | 0 | ON | ON | OFF | ON | ON |
| 1 | 0 | 1 | 1 | 0 | 0 | ON | ON | OFF | ON | ON |
| 1 | 1 | 0 | 1 | 1 | 0 | ON | ON | ON | ON | ON |
| 1 | 1 | 1 | 1 | 0 | 0 | ON | ON | OFF | ON | ON |
| — | — | — | 1 | 1 | 1 | — | — | — | — | — |

To illustrate the operation of bit decode circuit 59, assume C1, C2 and C3 are respectively 1, 1, 0 and that the SW3 and /SW3 outputs of window comparators 54 are at the same logic state indicating an error state for one of the two switch drivers 38 or 40 which can be either an open circuit or a short circuit condition. Assuming that SW3 and /SW3 are logic ones the output of Exclusive-Or gate 60 will be a "0", the outputs of Exclusive-Or gates 62, 64, 66, 68 will be logic ones and the output of Exclusive-Or gate 80 will be a logic zero. Since the output of Exclusive-Or gate 60 is "0", the outputs of AND gates 70, 72, 74 and 76 are also logic zeros resulting in a zero at the first inputs of NAND gates 84, 86 and 88. The output of NAND gate 82 is a "0" resulting in "0" being supplied to the second input of NAND gate 88, while a "1" is supplied to the second input of NAND gate 86 and a "1" is supplied to the second input of NAND gate 84. The output of NAND gates 84, 86 and 88 are respectively 1, 1, 1 which indicates an error condition.

Under normal operation, that is when the SW(3)1 input of bit decode circuit 59 is "1" and the /SW(3)1 input of bit decode circuit 59 is "0", a logic will be provided at the output of AND gate 76, since the output of each Exclusive-OR gate 60, 62, 64, 66 and 68 is a logic one. The logic one occurring at the output of AND gate 76 is supplied to the first inputs of NAND gates 84, 86 and 88. It should be noted that /F input of bit decode circuit 59 receives a logic one signal during normal operation of electronic switching interface 20.

The output of Exclusive-OR gate 80 is a "1" resulting in logic zeros at the first and second inputs of NAND gate 82. The output of NAND gate 82 is now a one which is supplied to the second input of NAND gate 88, resulting in a logic zero at the output of NAND gate 88. Since the second inputs of NAND gates 84 and 86 are logic zeros the output of NAND gates 84 and 86 will be logic ones. Thus, the S1, S2 and S3 outputs of bit decode circuit 59 will be 1,1,0 which corresponds to the truth Table II.

Whenever an error occurs the status outputs S1, S2 and S3 of bit decode circuit 59 will be at the logic one state.

Figure 2:
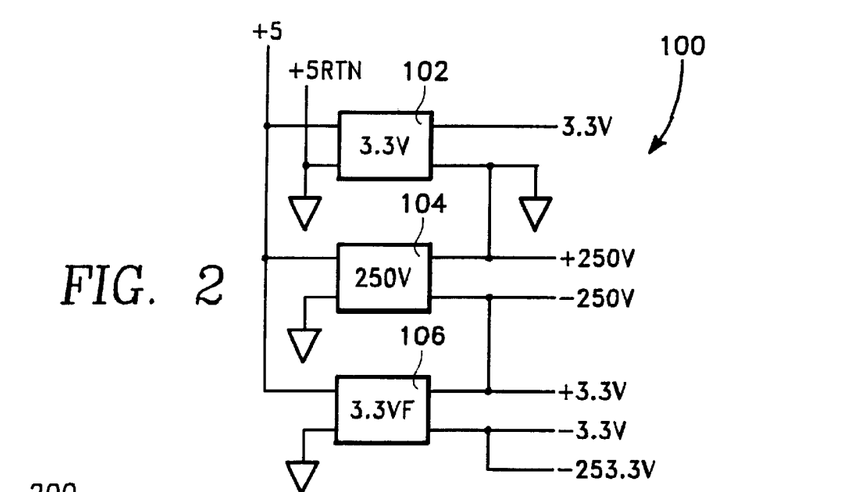
FIG. 2 is a simplified block diagram of the power supply system for the interface of FIG. 1.
Figure 10:
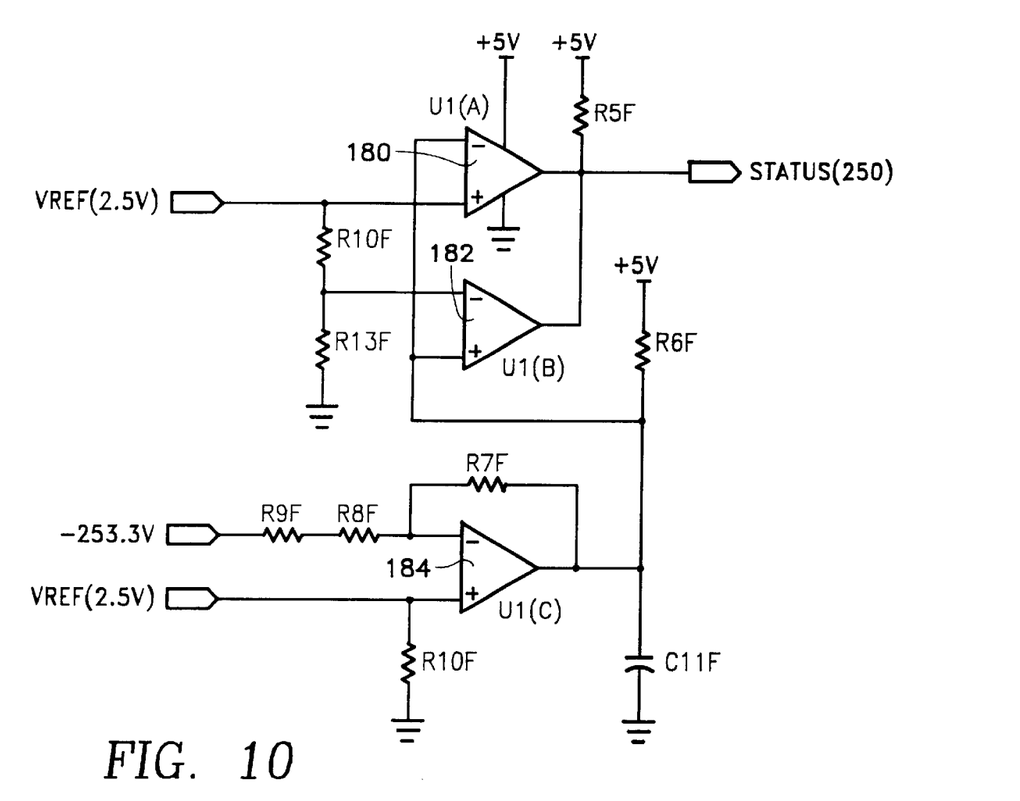
FIG. 10 is a detailed electronic circuit of a window comparator which provides status data for the −250 volt power supply of FIG. 2.
Figure 11:
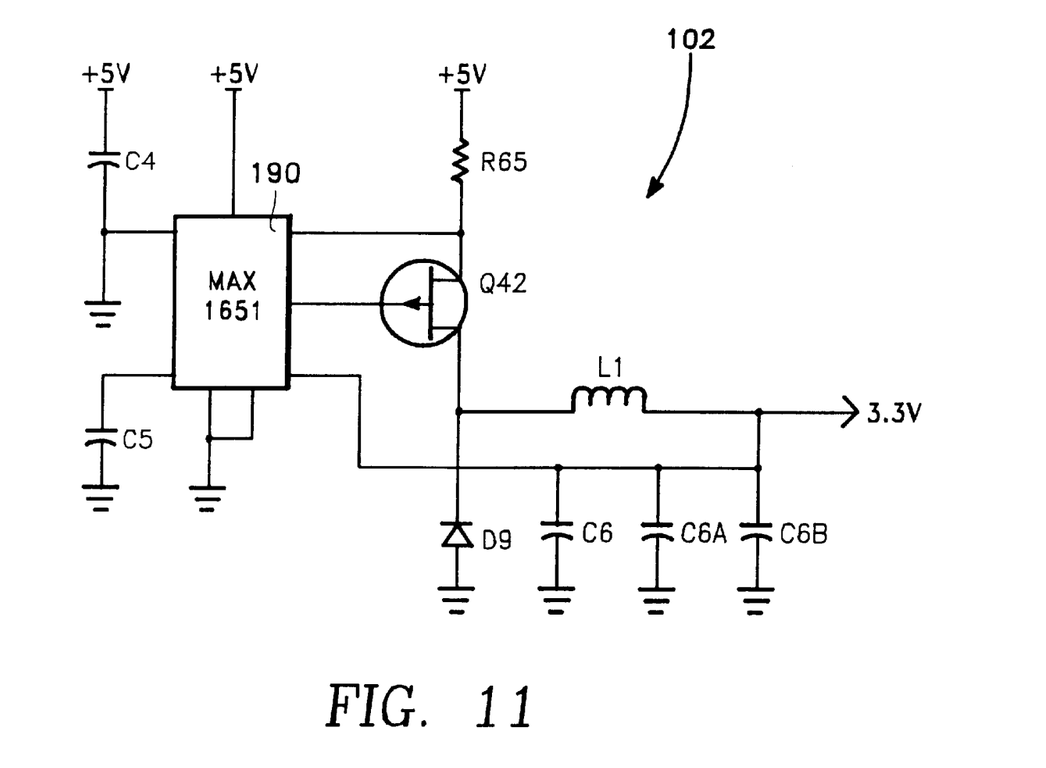
FIG. 11 is a detailed electronic circuit diagram of the 3.3 volt power source of FIG. 2.

Referring to FIGS. 1, 2 and 10, the electronics circuit of FIG. 10 operates as a status indicator for the −253.3 volts provided by power supply 106 (FIG. 2). Operational amplifier 184 inverts the −253.3 volts to a positive voltage of approximately 1.7 volts. This positive voltage of one volt is supplied to a window comparator consisting of comparators 180 and 182. The positive input of comparator 180 receives a voltage of 2.5 volts and the negative input of comparator 182 receives a voltage of 1.25 volts. Resistor R10F and R13F operate as a voltage divider reducing the input voltage by one half. When the voltage is within the window of from 1.25 volts to 2.5 volts, a "1" is provided at the STATUS(250) output of status circuit of FIG. 10. When the voltage is outside the window of from 1.25 volts to 2.5 volts, a "0" is provided at the STATUS(250) output of status circuit of FIG. 10.

Referring now to FIGS. 1 and 3, the switching circuit 200 shows each switch S1, S2, S3, S4 and S5 (designated respectively by the reference numerals 202, 204, 206, 208 and 209) in the OFF position. When switch S1 is in the OFF position terminal J1 is connected to terminal J2 in the manner illustrated in FIG. 1. Similarly, when switch S4 is in the OFF position terminal J3 is connected to terminal J2 also in the manner illustrated in FIG. 1.

When the C1, C2 and C3 inputs to buffer decoder 22 are 0,1,0, the switches S1, S2, S3, S4 and S5 are set in accordance with TABLE I as follows: switch 202 is ON; switch 204 is OFF; switch 206 is ON; switch 208 is OFF and switch 209 is OFF. This connects terminal J2 through switches 202, 204 and 206 to terminal J6. Similarly, When the C1, C2 and C3 inputs to buffer decoder 22 are 1,1,0, the switches S1, S2, S3, S4 and S5 are set in accordance with TABLE I as follows: each switch 202, 204, 206, 208 and 210 is ON. This connects terminal J2 through switches 202 and 204 to terminal J7 and also connects terminal J4 through switches 208 and 209 to terminal J8. Switches S4 and S5 are connected in series to provide an isolation of 100 dB.

Figure 12:
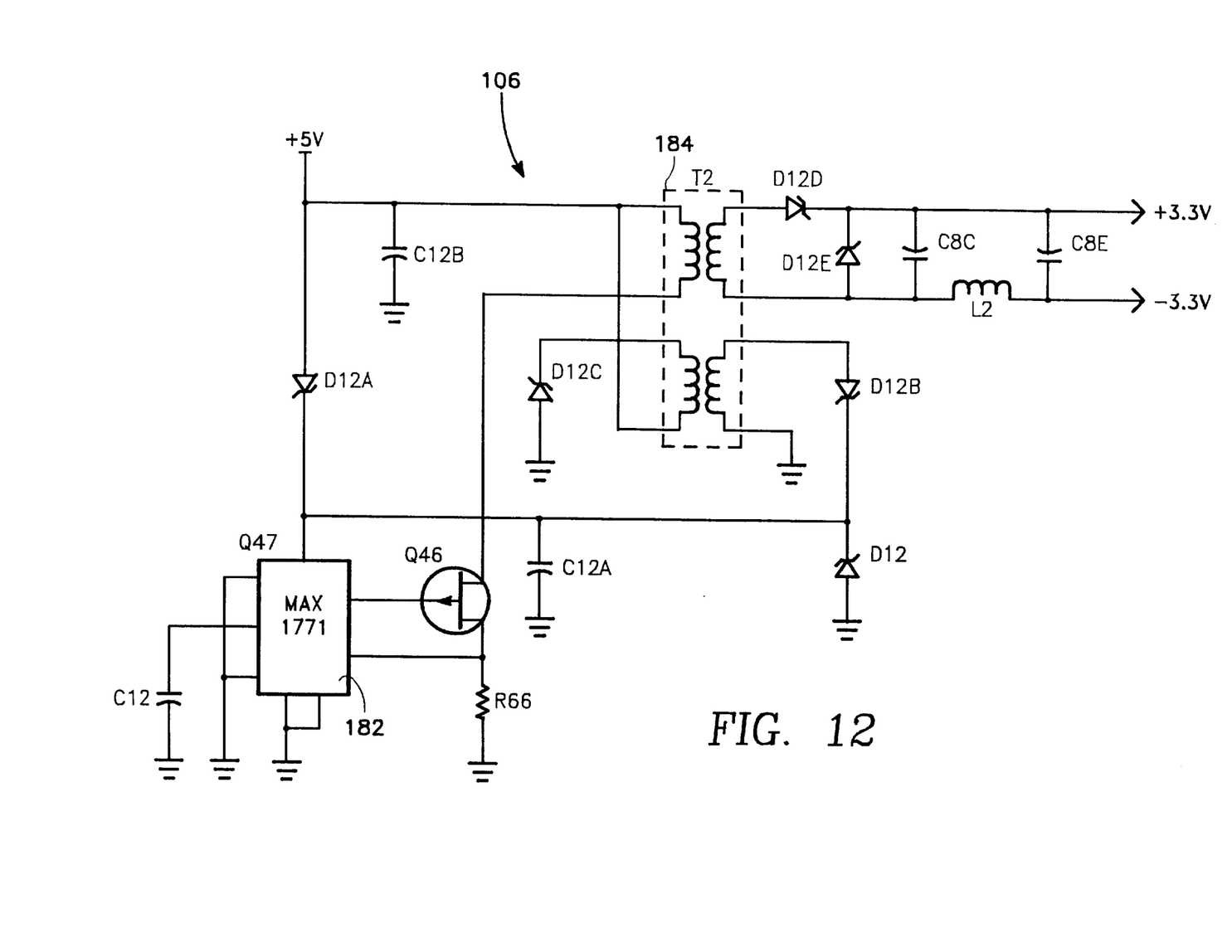
FIG. 12 is a detailed electronic circuit diagram of the floating 3.3 volt power source of FIG. 2.
Figure 13:
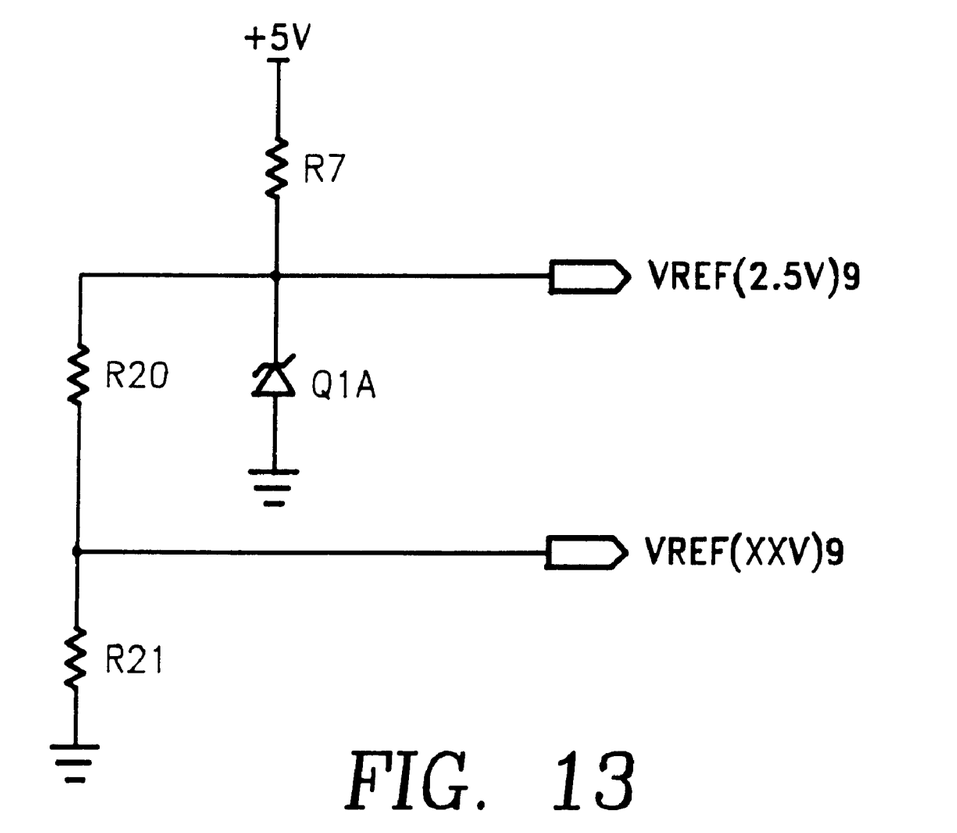
FIG. 13 is a detailed electronic circuit diagram of a power source which provides reference voltages of 2.5 volts and 1.5 volts to the window comparators of FIGS. 7A, 7B, 8A and 8B and 2.5 volts to the window comparator of FIG. 11.

Referring now to FIGS. 2, 11, 12 and 13, FIG. 11 is a detailed electronic circuit diagram of the 3.3 volt power source 102 of FIG. 2 which provides a voltage of 3.3 volts at its output. FIG. 12 is a detailed electronic circuit diagram of the floating 3.3 volt power source 106 of FIG. 2 which provides voltages of +3.3 volts and −3.3 volts at its outputs. FIG. 13 is a detailed electronic circuit diagram of a power source which provides reference voltages of 2.5 volts and 1.5 volts to the window comparators 50 and 52 of FIGS. 7A, 7B, 8A and 8B and 2.5 volts to the window comparator of FIG. 11.

Figure 4:
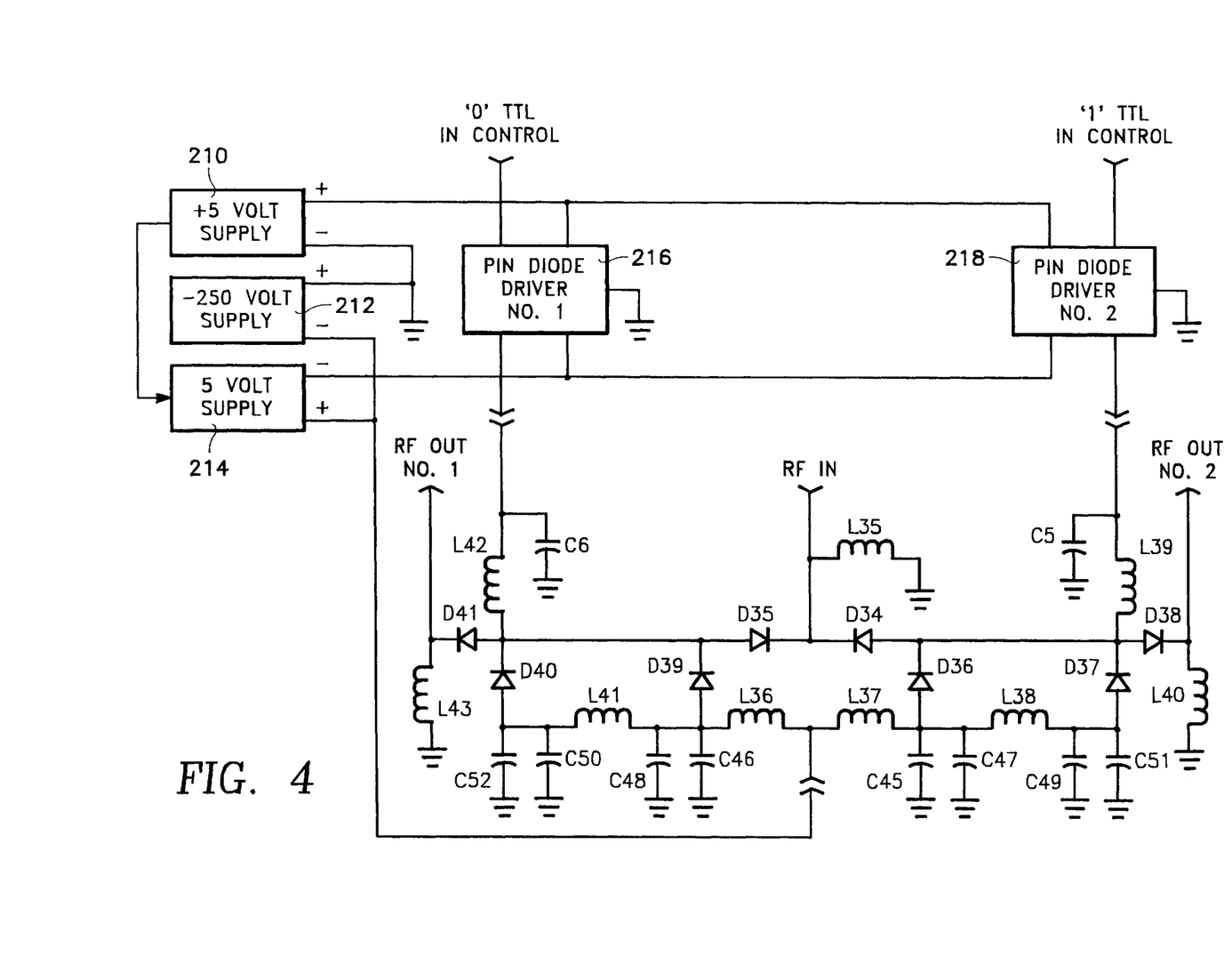
FIG. 4 is a detailed electronic circuit diagram for each of the SPDT (single pole double throw) switching elements and the RF circuitry associated therewith of FIG. 3.

Referring to FIGS. 1, 3 and 4, FIG. 4 is a detailed electronic circuit diagram for each of the SPDT (single pole double throw) switch S1, S2, S3, S4, and S5 and the RF circuitry associated therewith of FIG. 3. PIN diode drivers 216 and 218 may, for example, illustrate the drivers S1 and /S1 for switch S1 or the drivers S2 and /S2 for switch S2.

From the foregoing, it may readily be seen that the present invention comprises a new, unique and exceedingly useful electronic switching interface for use in radar systems which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. An electronic switching interface for use in radar systems to route RF signals through a plurality of RF switches, comprising:

first decoding means for receiving a plurality of control signals, said first decoding means decoding said control signals to provide a plurality of decoded output signals;

a plurality of switch driving means connected to said first decoding means to receive said plurality of decoded output signals, said plurality of switch driving means, responsive to said decoded output signals, selectively turning on and turning off said plurality of RF switches;

a pair of switch driving means of said plurality of switch driving means being connected to an RF switch of said plurality of RF switches, one of said pair of switch driving means turning on said RF switch connected thereto and the other of said pair of switch driving means turning off said RF switch connected thereto;

a plurality of comparing means, one of said plurality of comparing means being connected to one of the pair of switch driving means of said plurality of switching driving means;

each comparing means of said plurality of comparing means monitoring output signals from said pair of switch driving means connected thereto and providing a pair of logic signals having opposite states whenever one of said output signals from said pair of switch driving means is within a preset voltage range; and second decoding means connected to said plurality of comparing means to receive said pair of logic signals from each of said plurality of comparing, said bit decoding means decoding said pair of logic signals from each of said plurality of comparing means to provide a status signal indicating that said pair of switch driving means for each of said plurality of RF switches are operating normally.

2. The electronic switching interface of claim 1 wherein said first decoding means comprises:

a first AND gate having a first input for receiving a first of said plurality of control signals, a second input for receiving a logic one signal and an output;

a first Exclusive-OR gate having a first input for receiving a second of said plurality of control signals, a second input for receiving a third of said plurality of control signals and an output;

a second Exclusive-OR gate having a first input connected to the output of said first AND gate, a second input connected to ground and an output connected to a first of said plurality of switch driving means;

a first inverter having an input connected to the output of said first AND gate and an output connected to a second of said plurality of switch driving means;

a second inverter having an input connected to the output of said first Exclusive-OR gate and an output;

a second AND gate having a first input connected to the output of said first inverter, a second input connected to the output of said second inverter and an output connected to a third of said plurality of switch driving means;

a third inverter having an input connected to the output of said second AND gate and an output connected to a fourth of said plurality of switch driving means;

a fourth inverter having an input for receiving the third of said plurality of control signals and an output;

a third AND gate having a first input for receiving the second of said plurality of control signals, a second input connected to the output of said fourth inverter and an output connected to a fifth of said plurality of switch driving means;

a fifth inverter having an input connected to the output of said third AND gate and an output connected to a sixth of said plurality of switch driving means;

a sixth inverter having an input connected to the output of said first AND gate and an output connected to a seventh of said plurality of switch driving means;

a seventh inverter having an input connected to the output of said sixth inverter and an output connected to an eighth of said plurality of switch driving means;

an eighth inverter having an input connected to the output of said first AND gate and an output connected to a ninth of said plurality of switch driving means; and an ninth inverter having an input connected to the output of said first AND gate and an output connected to a tenth of said plurality of switch driving means.

3. The electronic switching interface of claim 1 wherein said plurality of switch driving means comprises ten switch drivers.

4. The electronic switching interface of claim 1 wherein said plurality of comparing means comprises five window comparators.

5. The electronic switching interface of claim 1 wherein said preset voltage range is within a window having a range from about 0.7 of a volt to about 2.5 volts.

6. The electronic switching interface of claim 1 wherein said bit decoder comprises:

a first Exclusive-OR gate having first and second inputs connected to a first of said plurality comparing means and an output;

a second Exclusive-OR gate having first and second inputs connected to a second of said plurality of comparing means and an output;

a first AND gate having a first input connected to the output of said first Exclusive-OR gate, a second input connected to the output of said second Exclusive-OR gate and an output;

a third Exclusive-OR gate having first and second inputs connected to a third of said plurality of comparing means and an output;

a fourth Exclusive-OR gate having first and second inputs connected to a fourth of said plurality of comparing means and an output;

a second AND gate having a first input connected to the output of said third Exclusive-OR gate, a second input connected to the output of said fourth Exclusive-OR gate and an output;

a third AND gate having a first input connected to the output of said first AND gate, a second input connected to the output of said second AND gate and an output;

a fifth Exclusive-OR gate having first and second inputs connected to a fifth of said plurality of comparing means and an output;

a fourth AND gate having a first input connected to the output of said third AND gate, a second input connected to the output of said fifth Exclusive-OR gate and an output;

a fifth AND gate having a first input for receiving a logic one signal, a second input connected to the output of said fourth AND gate and an output;

a sixth Exclusive-OR gate having a first input connected to the third of said plurality of comparing means, a second input connected to the fifth of said plurality of comparing means and an output;

a first NAND gate having a first input connected to the output of said sixth Exclusive-OR gate, a second input connected to the first of said plurality of comparing means and an output;

a second NAND gate having a first input connected to the output of said first NAND gate, a second input connected to the output of said fifth AND gate and an output;

a third NAND gate having a first input connected to the the first of said plurality of comparing means, a second input connected to the output of said fifth AND gate and an output; and a fourth NAND gate having a first input connected to the fifth of said plurality of comparing means, a second input connected to the output of said fifth AND gate and an output;

the output of said second NAND gate, the output of said third NAND gate and the output of said fourth NAND gate providing said status signal.

7. The electronic switching interface of claim 1 wherein said status signal comprises a three bit status signal having first, second and third logic one states when said pair of switch driving means for each of said plurality of RF switches are operating normally.

8. An electronic switching interface for use in radar systems to route RF signals through a plurality of RF switches, comprising:

a buffer decoder for receiving a plurality of control signals, said buffer decoder decoding said control signals to provide a plurality of decoded output signals;

a plurality of switch drivers connected to said buffer decoder to receive said plurality of decoded output signals, said plurality of switch drivers, responsive to said decoded output signals, selectively turning on and turning off said plurality of RF switches;

a pair of switch drivers of said plurality of switch drivers being connected to an RF switch of said plurality of RF switches, one of said pair of switch drivers turning on said RF switch connected thereto and the other of said pair of switch drivers turning off said RF switch connected thereto;

a plurality of window comparators, one of said plurality of window comparators being connected to one of the pair of switch drivers of said plurality of switch drivers;

each window comparator of said plurality of window comparators monitoring output signals from said pair of switch drivers connected thereto and providing a pair of logic signals having opposite states whenever one of said output signals from said pair of switch drivers is within a preset voltage range; and a bit decoder connected to said plurality of window comparators to receive said pair of logic signals from each of said plurality of window comparators, said bit decoder decoding said pair of logic signals from each of said plurality of window comparators to provide a status signal indicating that said pair of switch drivers for each of said plurality of RF switches are operating normally.

9. The electronic switching interface of claim 8 wherein said buffer decoder comprises:

a first AND gate having a first input for receiving a first of said plurality of control signals, a second input for receiving a logic one signal and an output;

a first Exclusive-OR gate having a first input for receiving a second of said plurality of control signals, a second input for receiving a third of said plurality of control signals and an output;

a second Exclusive-OR gate having a first input connected to the output of said first AND gate, a second input connected to ground and an output connected to a first of said plurality of switch drivers;

a first inverter having an input connected to the output of said first AND gate and an output connected to a second of said plurality of switch drivers;

a second inverter having an input connected to the output of said first Exclusive-OR gate and an output;

a second AND gate having a first input connected to the output of said first inverter, a second input connected to the output of said second inverter and an output connected to a third of said plurality of switch drivers;

a third inverter having an input connected to the output of said second AND gate and an output connected to a fourth of said plurality of switch drivers;

a fourth inverter having an input for receiving the third of said plurality of control signals and an output;

a third AND gate having a first input for receiving the second of said plurality of control signals, a second input connected to the output of said fourth inverter and an output connected to a fifth of said plurality of switch drivers;

a fifth inverter having an input connected to the output of said third AND gate and an output connected to a sixth of said plurality of switch drivers;

a sixth inverter having an input connected to the output of said first AND gate and an output connected to a seventh of said plurality of switch drivers;

a seventh inverter having an input connected to the output of said sixth inverter and an output connected to an eighth of said plurality of switch drivers;

an eighth inverter having an input connected to the output of said first AND gate and an output connected to a ninth of said plurality of switch drivers; and an ninth inverter having an input connected to the output of said first AND gate and an output connected to a tenth of said plurality of switch drivers.

10. The electronic switching interface of claim 8 wherein said plurality of switch drivers comprises ten switch drivers.

11. The electronic switching interface of claim 8 wherein said plurality of window comparators comprises five window comparators.

12. The electronic switching interface of claim 8 wherein said preset voltage range is within a window having a range from about 0.7 of a volt to about 2.5 volts.

13. The electronic switching interface of claim 8 wherein said bit decoder comprises:

a first Exclusive-OR gate having first and second inputs connected to a first of said plurality of window comparators and an output;

a second Exclusive-OR gate having first and second inputs connected to a second of said plurality of window comparators and an output;

a first AND gate having a first input connected to the output of said first Exclusive-OR gate, a second input connected to the output of said second Exclusive-OR gate and an output;

a third Exclusive-OR gate having first and second inputs connected to a third of said plurality of window comparators and an output;

a fourth Exclusive-OR gate having first and second inputs connected to a fourth of said plurality of window comparators and an output;

a second AND gate having a first input connected to the output of said third Exclusive-OR gate, a second input connected to the output of said fourth Exclusive-OR gate and an output;

a third AND gate having a first input connected to the output of said first AND gate, a second input connected to the output of said second AND gate and an output;

a fifth Exclusive-OR gate having first and second inputs connected to a fifth of said plurality of window comparators and an output;

a fourth AND gate having a first input connected to the output of said third AND gate, a second input connected to the output of said fifth Exclusive-OR gate and an output;

a fifth AND gate having a first input for receiving a logic one signal, a second input connected to the output of said fourth AND gate and an output;

a sixth Exclusive-OR gate having a first input connected to the third of said plurality of window comparators, a second input connected to the fifth of said plurality of window comparators and an output;

a first NAND gate having a first input connected to the output of said sixth Exclusive-OR gate, a second input connected to the first of said plurality of window comparators and an output;

a second NAND gate having a first input connected to the output of said first NAND gate, a second input connected to the output of said fifth AND gate and an output;

a third NAND gate having a first input connected to the the first of said plurality of window comparators, a second input connected to the output of said fifth AND gate and an output; and a fourth NAND gate having a first input connected to the fifth of said plurality of window comparators, a second input connected to the output of said fifth AND gate and an output;

the output of said second NAND gate, the output of said third NAND gate and the output of said fourth NAND gate providing said status signal.

14. The electronic switching interface of claim 8 wherein said status signal comprises a three bit status signal having first, second and third logic one states when said pair of switch drivers for each of said plurality of RF switches are operating normally.

15. The electronic switching interface of claim 8 wherein said bit decoder comprises:

a first Exclusive-OR gate having first and second inputs connected to a first of said five window comparators and an output;

a second Exclusive-OR gate having first and second inputs connected to a second of said five window comparators and an output;

a first AND gate having a first input connected to the output of said first Exclusive-OR gate, a second input connected to the output of said second Exclusive-OR gate and an output;

a third Exclusive-OR gate having first and second inputs connected to a third of said five window comparators and an output;

a fourth Exclusive-OR gate having first and second inputs connected to a fourth of said five window comparators and an output;

a second AND gate having a first input connected to the output of said third Exclusive-OR gate, a second input connected to the output of said fourth Exclusive-OR gate and an output;

a third AND gate having a first input connected to the output of said first AND gate, a second input connected to the output of said second AND gate and an output;

a fifth Exclusive-OR gate having first and second inputs connected to a fifth of said five window comparators and an output;

a fourth AND gate having a first input connected to the output of said third AND gate, a second input connected to the output of said fifth Exclusive-OR gate and an output;

a fifth AND gate having a first input for receiving a logic one signal, a second input connected to the output of said fourth AND gate and an output;

a sixth Exclusive-OR gate having a first input connected to the third of said five window comparators, a second input connected to the fifth of said five window comparators and an output;

a first NAND gate having a first input connected to the output of said sixth Exclusive-OR gate, a second input connected to the first of said five window comparators and an output;

a second NAND gate having a first input connected to the output of said first NAND gate, a second input connected to the output of said fifth AND gate and an output;

a third NAND gate having a first input connected to the the first of said five window comparators, a second input connected to the output of said fifth AND gate and an output; and a fourth NAND gate having a first input connected to the fifth of said five window comparators, a second input connected to the output of said fifth AND gate and an output;

the output of said second NAND gate, the output of said third NAND gate and the output of said fourth NAND gate providing said status signal.

16. An electronic switching interface for use in radar systems to route RF signals through five RF switches, comprising:

a buffer decoder for receiving a plurality of control signals, said buffer decoder decoding said control signals to provide a plurality of decoded output signals;

ten switch drivers connected to said buffer decoder to receive said plurality of decoded output signals, said ten switch drivers, responsive to said decoded output signals, selectively turning on and turning off said five RF switches;

a pair of switch drivers of said ten switch drivers being connected to an RF switch of said five RF switches, one of said pair of switch drivers turning on said RF switch connected thereto and the other of said pair of switch drivers turning off said RF switch connected thereto;

five window comparators, each window comparator of said five window comparators being connected to one of the pair of switch drivers of said five switch drivers;

each window comparator of said five window comparators monitoring output signals from said pair of switch drivers connected thereto and providing a pair of logic signals having opposite states whenever one of said output signals from said pair of switch drivers is within a preset voltage range; and a bit decoder connected to said five window comparators to receive said pair of logic signals from each of said five window comparators, said bit decoder decoding said pair of logic signals from each of said five window comparators to provide a status signal indicating that said pair of switch drivers for each of said five RF switches are operating normally.

17. The electronic switching interface of claim 16 wherein said buffer decoder comprises:

a first AND gate having a first input for receiving a first of said plurality of control signals, a second input for receiving a logic one signal and an output;

a first Exclusive-OR gate having a first input for receiving a second of said plurality of control signals, a second input for receiving a third of said plurality of control signals and an output;

a second Exclusive-OR gate having a first input connected to the output of said first AND gate, a second input connected to ground and an output connected to a first of said ten switch drivers;

a first inverter having an input connected to the output of said first AND gate and an output connected to a second of said ten switch drivers;

a second inverter having an input connected to the output of said first Exclusive-OR gate and an output;

a second AND gate having a first input connected to the output of said first inverter, a second input connected to the output of said second inverter and an output connected to a third of said ten switch drivers;

a third inverter having an input connected to the output of said second AND gate and an output connected to a fourth of said ten switch drivers;

a fourth inverter having an input for receiving the third of said plurality of control signals and an output;

a third AND gate having a first input for receiving the second of said plurality of control signals, a second input connected to the output of said fourth inverter and an output connected to a fifth of said ten switch drivers;

a fifth inverter having an input connected to the output of said third AND gate and an output connected to a sixth of said ten switch drivers;

a sixth inverter having an input connected to the output of said first AND gate and an output connected to a seventh of said ten switch drivers;

a seventh inverter having an input connected to the output of said sixth inverter and an output connected to an eighth of said ten switch drivers;

an eighth inverter having an input connected to the output of said first AND gate and an output connected to a ninth of said ten switch drivers; and an ninth inverter having an input connected to the output of said first AND gate and an output connected to a tenth of said ten switch drivers.

18. The electronic switching interface of claim 16 wherein said preset voltage range is within a window having a range from about 0.7 of a volt to about 2.5 volts.

19. The electronic switching interface of claim 16 wherein said status signal comprises a three bit status signal having first, second and third logic one states when said pair of switch drivers for each of said five RF switches are operating normally.

* * * * *